GARRISON & MOREY.
Spoke-Socket.
No. 14,311.
Patented Feb. 26, 1856.
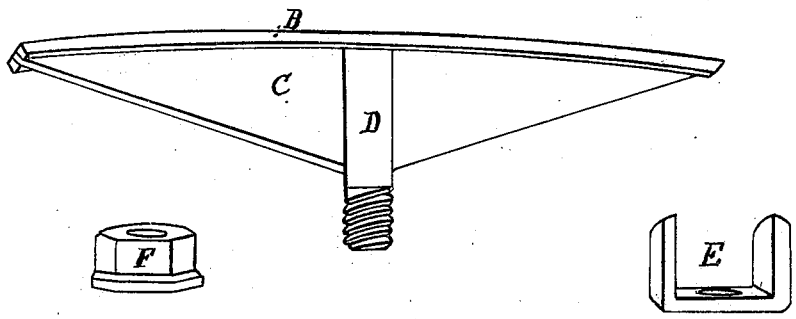
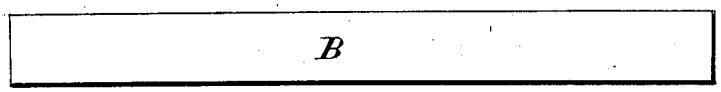
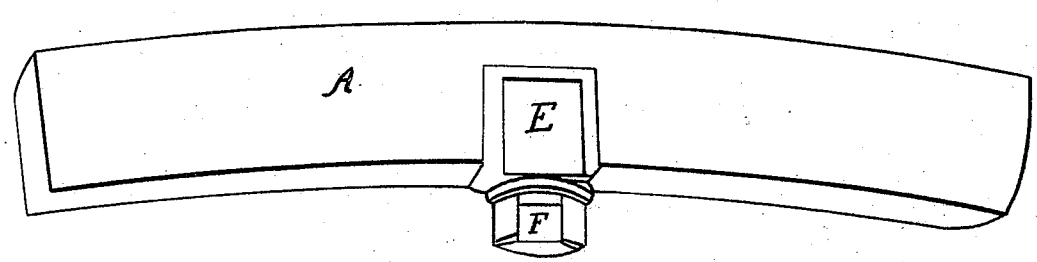
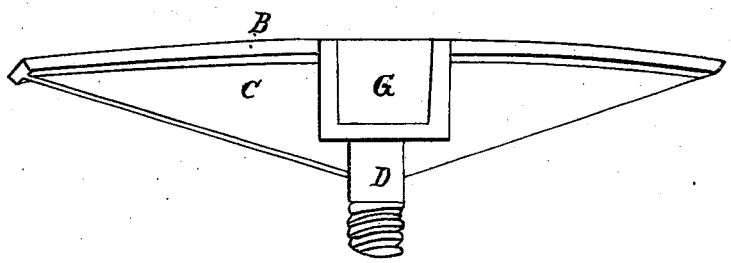
Witnesses.
J. S. T. Cushing
F. A. Peerce
Inventors
Story A. Garrison
Daniel C. Morey

UNITED STATES PATENT OFFICE.

S. A. GARRISON AND D. C. MOREY, OF CHELSEA. MASSACHUSETTS.

COUPLING FOR THE JOINTS OF FELLIES.

Specification of Letters Patent No. 14,311, dated February 26, 1856.

*To all whom it may concern:*

Be it known that we, STACY A. GARRISON and DAVID C. MOREY, of Chelsea, in the county of Suffolk and State of Massachusetts, have invented a new and Improved Mode of Holding the Joints of Fellies or Rims of Carriage-Wheels Securely and Firmly in their Place, which we call a "Flange tongue-bolt;" and we do hereby declare that the following is a full, clear, and exact description of the construction and application of the same, reference being had to the accompanying model and drawings, making a part of this specification, in which—

A, is the felly or rim showing the joint.

B, is the flange which is connected with the bolt D, by the tongue C, making one piece.

E, is the clamp to go under the rim and over the end of the bolt D, and the joint; secured by the nut F, as shown in Figures A, E, F; or the clamp may be connected with the flange B, as shown in Fig. B, C, G, D.

To enable others to make and use our invention, we will proceed to designate and describe its construction and application.

We construct the flange B, to be let into the rim or felly A under the tire with the tongue C, to be let into a groove or slot cut in the ends of the rim or felly A, at the joints where the ends meet, the bolt D, passing through the center of the joint, and through the clamp E, secured by the nut F, as shown in Figs. A, E, F.

We do not claim of itself a mere overlapping brace tightened by a separate bolt, as is used for stiffening joints, but We do claim as new and of our own invention and desire to secure by Letters Patent—

The stay bolt composed of head, stay and bolt as described, in combination with the embracing cap piece tightened as specified; for securing the joints of fellies from lateral movement, in addition to security against radial action.

In witness whereof we have hereunto subscribed our names this fifth day of October eighteen hundred and fifty five.

STACY A. GARRISON.
DANIEL C. MOREY.

In presence of—
J. I. T. CUSHING,
F. A. PIERCE,